US012776173B2

(12) United States Patent
Tomida et al.

(10) Patent No.: US 12,776,173 B2
(45) Date of Patent: Oct. 27, 2026

(54) VEHICLE SURROUNDINGS MONITORING DEVICE, VEHICLE SURROUNDINGS MONITORING METHOD, AND RECORDING MEDIUM

(71) Applicant: Panasonic Intellectual Property Management Co., Ltd., Osaka (JP)

(72) Inventors: Takeo Tomida, Kanagawa (JP); Manabu Nakakita, Kanagawa (JP); Yoshito Hirai, Aichi (JP); Wataru Hirata, Kanagawa (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 188 days.

(21) Appl. No.: 18/403,449

(22) Filed: Jan. 3, 2024

(65) Prior Publication Data

US 2024/0249568 A1 Jul. 25, 2024

(30) Foreign Application Priority Data

Jan. 24, 2023 (JP) ................................ 2023-008684

(51) Int. Cl.

*G05D 1/00* (2024.01)
*G07C 5/08* (2006.01)
*G01S 13/931* (2020.01)

(52) U.S. Cl.

CPC .... *G07C 5/0808* (2013.01); *G01S 2013/9324* (2020.01); *G01S 2013/93274* (2020.01)

(58) Field of Classification Search

CPC .................................................. G07C 5/0808
See application file for complete search history.

(56) References Cited

U.S. PATENT DOCUMENTS 4,908,780 A * 3/1990 Priem .................... G09G 5/393
345/611
2011/0282581 A1 11/2011 Zeng
(Continued)

FOREIGN PATENT DOCUMENTS

JP H11283173 A 10/1999
JP 2021021967 A 2/2021
(Continued)

OTHER PUBLICATIONS

Notice of Reasons for Refusal, dated Aug. 4, 2026, for Japanese Patent Application No. 2023-008684. (10 pages) (with English Translation).
(Continued)

*Primary Examiner* — Ramon A. Mercado
*Assistant Examiner* — Paul W Arellano
(74) *Attorney, Agent, or Firm* — Seed Intellectual Property Law Group LLP

(57) ABSTRACT

A vehicle surroundings monitoring device measures coordinates of an obstacle on a first coordinate system on the basis of a position of the vehicle at a first time point at which a transmission wave is output and a position of the vehicle at a second time point at which a reflected wave of the transmission wave is detected. The monitoring device writes, to a storage device, coordinates of the obstacle on a second coordinate system having a resolution lower than a resolution of the first coordinate system when power turn-off of the vehicle is detected. The monitoring device reads, from the storage device, the coordinates of the obstacle on the second coordinate system when power turn-on of the vehicle is detected. The monitoring device determines whether the vehicle and the obstacle come into contact with each other by using the coordinates of the obstacle read from the storage device.

9 Claims, 12 Drawing Sheets

(56) References Cited

U.S. PATENT DOCUMENTS

| | | | | |
|---|---|---|---|---|
| 2021/0096241 | A1 | 4/2021 | Bongio Karrman et al. | |
| 2022/0230446 | A1* | 7/2022 | Miyamoto | G01S 15/93 |
| 2022/0317265 | A1* | 10/2022 | Lee | G01S 17/42 |
| 2023/0156341 | A1* | 5/2023 | Kato | H04N 23/72<br>348/148 |
| 2023/0245444 | A1* | 8/2023 | Brockers | G06T 17/05<br>348/144 |

FOREIGN PATENT DOCUMENTS

| | | | |
|---|---|---|---|
| JP | 2021064136 | A | 4/2021 |
| JP | 2021135192 | A | 9/2021 |
| JP | 2022549913 | A | 11/2022 |

OTHER PUBLICATIONS

Search Report, dated Jul. 31, 2026, for Japanese Patent Application No. 2023-008684. (22 pages)(with English Translation).

* cited by examiner

FIG.6

| PAT-TERN | SIDE SONAR | CHANGE IN OUTPUT OF DISTANCE MEASUREMENT SENSOR BETWEEN TIME OF POWER OFF AND TIME OF POWER ON | PATTERN EXAMPLE 1 | PATTERN EXAMPLE 2 | ○: VALID ×: INVALID | EXAMPLE: AUTOMATIC BRAKE ·STEERING WHEEL: MANUAL ·BRAKE: AUTOMATIC | EXAMPLE: AUTOMATIC EXIT ·STEERING WHEEL: AUTOMATIC ·BRAKE: AUTOMATIC |
|---|---|---|---|---|---|---|---|
| 1 | FRONT | ABSENT | 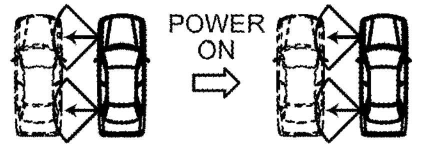  | 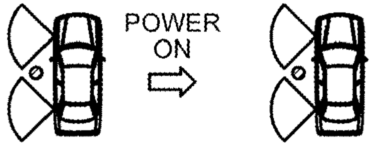  | ○ | ○ | ○ |
| | REAR | ABSENT | | | | | |
| 2 | FRONT | ABSENT | 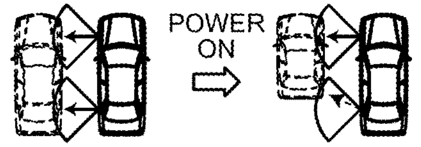  | 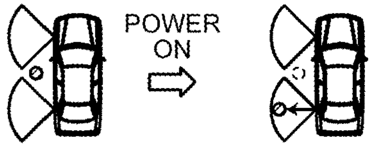  | * FLEXIBLE USE ACCORDING TO FUNCTION | × | ○ |
| | REAR | PRESENT | | | | | |
| 3 | FRONT | PRESENT | 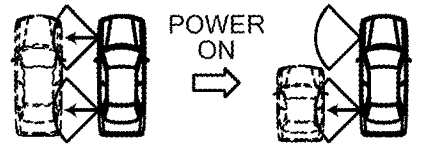  | 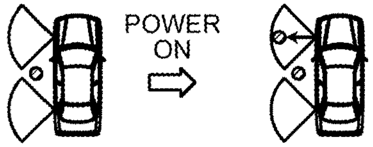  | * FLEXIBLE USE ACCORDING TO FUNCTION | × | ○ |
| | REAR | ABSENT | | | | | |
| 4 | FRONT | PRESENT | 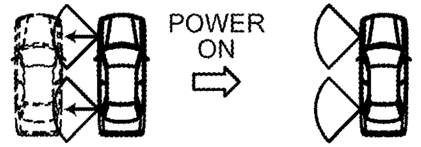  | 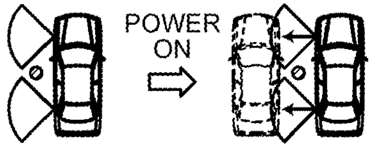  | × | × | × |
| | REAR | PRESENT | | | | | |

VEHICLE SURROUNDINGS MONITORING DEVICE, VEHICLE SURROUNDINGS MONITORING METHOD, AND RECORDING MEDIUM

CROSS-REFERENCE TO RELATED APPLICATIONS

This application is based upon and claims the benefit of priority from Japanese Patent Application No. 2023-008684, filed on Jan. 24, 2023, the entire contents of which are incorporated herein by reference.

FIELD

The present disclosure relates to a vehicle surroundings monitoring device, a vehicle surroundings monitoring method, and a recording medium.

BACKGROUND

A vehicle surroundings monitoring device that monitors the surrounding of a vehicle has been known.

For example, JP 2021-64136 A discloses a vehicle surroundings monitoring device that, when a power switch of a vehicle is turned off, stores a position of an obstacle, which is located around a vehicle and has been detected by an ultrasonic sensor in the past, and that performs notification and control on the basis of the stored position of the obstacle each time the power switch is turned on again.

The vehicle surroundings monitoring device according to such an existing technology stores a large amount of position information related to the presence position of the obstacle around the vehicle measured in the past when the power switch of the vehicle is turned off. Therefore, it is necessary to consider equipping the vehicle with a storage device having a large storage capacity. This might increase the cost.

In addition, an electronic control unit (ECU) is energized until information storage is completed after a power switch of a vehicle is turned off. Therefore, it is desired to enhance a hardware configuration.

SUMMARY

A vehicle surroundings monitoring device includes a distance measurement circuit, a vehicle state detection circuit, an information writing circuit, an information reading circuit, and a contact determination circuit. The distance measurement circuit is configured to measure coordinates of an obstacle on a first coordinate system on the basis of a first time point, a position of the vehicle at the first time point, a second time point, and a position of the vehicle at the second time point. The first time point is a time point at which a distance measurement device mounted on a vehicle outputs a transmission wave. The second time point is a time point at which the distance measurement device detects a reflected wave of the transmission wave. The vehicle state detection circuit is configured to detect a state of power of the vehicle. The information writing circuit is configured to write, to a storage device, coordinates of the obstacle on a second coordinate system having a resolution lower than a resolution of the first coordinate system when the vehicle state detection circuit detects power turn-off of the vehicle. The information reading circuit is configured to read, from the storage device, the coordinates of the obstacle on the second coordinate system written by the information writing circuit when the vehicle state detection circuit detects power turn-on of the vehicle. The contact determination circuit is configured to determine whether the vehicle and the obstacle come into contact with each other by using the coordinates of the obstacle read by the information reading circuit.

BRIEF DESCRIPTION OF THE DRAWINGS

FIG. 6 is a diagram illustrating validity of stored position information about a target;

DETAILED DESCRIPTION

Embodiment

Hereinafter, various embodiments of a vehicle surroundings monitoring device according to the present disclosure will be described with reference to the drawings.

Vehicle Surroundings Monitoring Device According to Existing Technology

A vehicle surroundings monitoring device according to an existing technology will be described with reference to FIGS. 1 and 2.

The vehicle surroundings monitoring device includes a plurality of distance measurement sensors 12*a* and 12*b* installed on a vehicle 10 so as to face outward. Examples of the distance measurement sensors 12*a* and 12*b* include ultrasonic sensors and millimeter wave radars. The distance measurement sensor 12 (an example of a distance measurement device) emits an ultrasonic wave or an electromagnetic wave and detects a reflected wave from an obstacle around the vehicle 10, thereby detecting a distance between the vehicle 10 and the obstacle, and a position of the obstacle.

Figure 1:
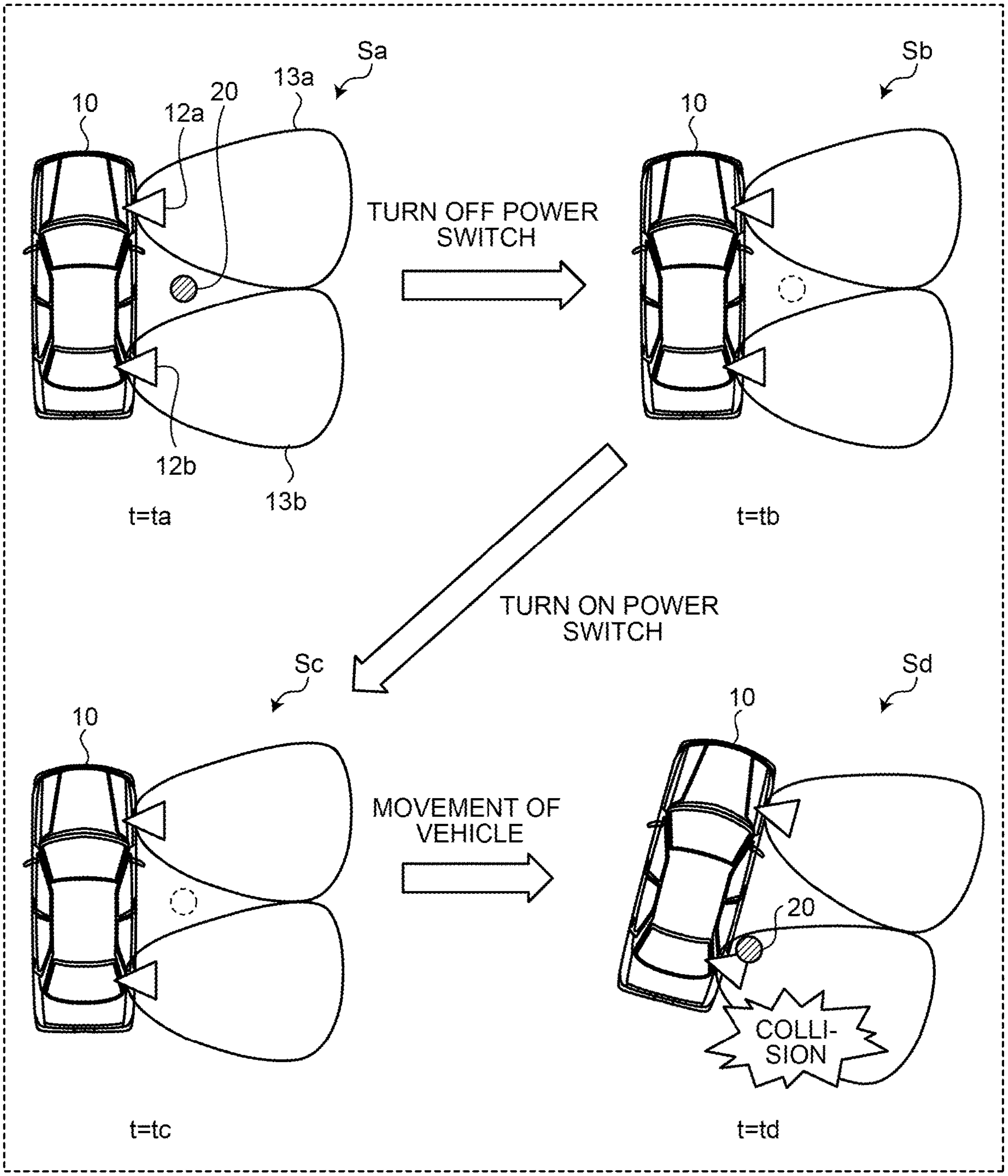
FIG. 1 is a first diagram illustrating a vehicle surroundings monitoring device according to an existing technology.

In the example of FIG. 1, the two distance measurement sensors 12*a* and 12*b* are installed so as to leave an interval on the right side of the vehicle 10. The distance measurement sensors 12*a* and 12*b* are ultrasonic sensors, for example. The distance measurement sensor 12*a* emits an ultrasonic wave to a distance measurement range 13*a* and receives a reflected wave from the obstacle. The distance measurement sensor 12*b* emits an ultrasonic wave to a distance measurement range 13*b* and receives a reflected wave from the obstacle.

At the time, for example, the distance measurement sensor 12*a* has the distance measurement range 13*a* which is wide. Therefore, it is difficult to determine the accurate position of the obstacle. Therefore, the vehicle 10 acquires, while moving, plural outputs of the distance measurement sensor 12*a* at different time points. By using the movement amount of the vehicle 10 and those outputs of the distance measurement sensor 12*a*, it is possible to determine the accurate position of the obstacle. Details will be described below (refer to FIG. 3). The distance measurement sensor 12*b* similarly determines an accurate position of the obstacle.

In an assumable example, the vehicle 10 enters a state Sa in FIG. 1 while moving forward. At this time, it is assumed that a target 20 is detected on the right side of the vehicle.

In this state, the driver of the vehicle 10 turns off the power switch of the vehicle 10. An example of the power switch of the vehicle is an ignition switch in the case of a non-electric vehicle equipped with a gasoline engine or a diesel engine, and is an electric power switch in the case of an electric vehicle such as an electric car or a hybrid car.

When the power switch of the vehicle 10 is turned off to transition to a state Sb, the information about the target 20 detected in the state Sa is discarded.

When the power switch of the vehicle 10 is turned on again, the state transitions to a state Sc. At this time, the distance measurement sensors 12*a* and 12*b* start operation, and the determination as to whether an obstacle is present within the distance measurement ranges 13*a* and 13*b* is performed. However, the vehicle 10 is stopped, so that it is difficult to detect the target 20 at a position outside the distance measurement ranges 13*a* and 13*b*.

When the driver is not aware of the presence of the target 20, there is a possibility, as indicated by a state Sd, that vehicle 10 and target 20 come into contact with each other because the driver moves the vehicle 10 forward.

Therefore, it is desirable to store the position of the target 20 when the power switch of the vehicle 10 is turned off. In the above-mentioned JP 2021-64136 A, when the power switch of the vehicle 10 is turned off, the position coordinates of the obstacle measured at that time are stored.

Figure 2:
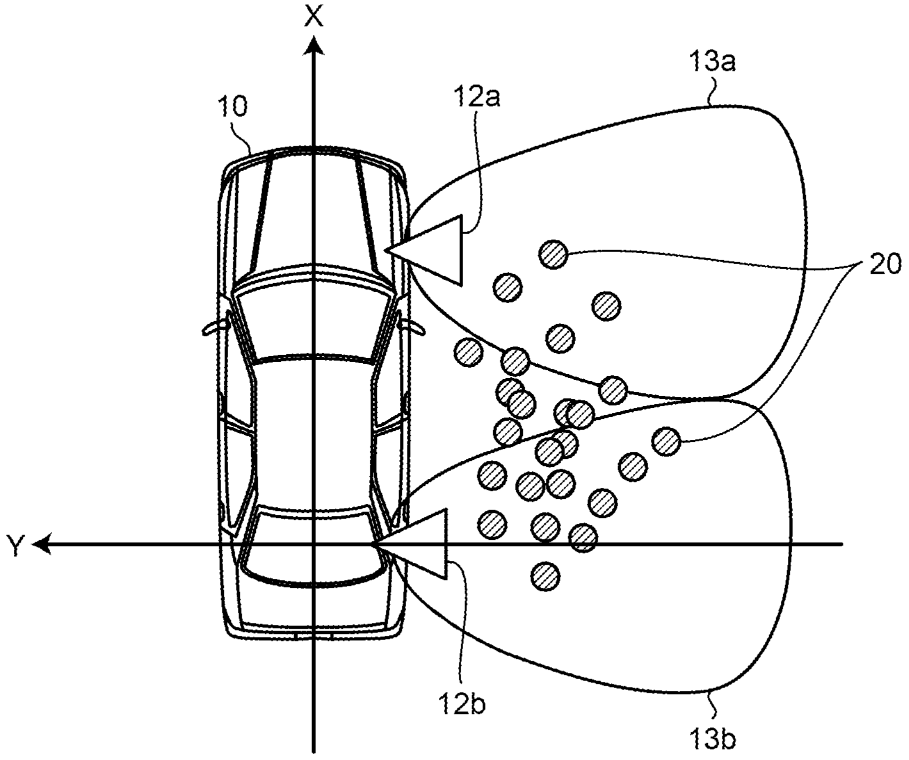
FIG. 2 is a second diagram illustrating the vehicle surroundings monitoring device according to the existing technology.

However, as illustrated in FIG. 2, a large number of pieces of position information about the target 20 are detected in practice. In order to store the position information about all the targets 20 when the power switch of the vehicle 10 is turned off, it is desirable to improve the performance of hardware and increase the storage capacity. In this regard, JP 2021-64136 A makes no reference to a specific countermeasure.

For example, here is an assumable case where 400 points of position information about the target 20 existing around the vehicle 10 are stored when the power switch of the vehicle 10 is turned off. When 8 bytes are used for storing the coordinates per one point, a storage capacity of 3200 bytes is used for storing the coordinates of 400 points. In a case where it takes 60 μsec to store 4-byte information in nonvolatile memory, it takes about 48 msec to store 3200 byte information in the nonvolatile memory. In the case of a system using a microcomputer in the existing technology, the time from the turn-off of the power switch to the resetting of the CPU is about 6 msec. Therefore, unless other measures are taken, the time is insufficient to store all the coordinates of 400 points.

A vehicle surroundings monitoring device 5 of the embodiment described below is capable of storing information related to the position of the surrounding obstacle measured in the past with a small storage capacity when the power switch of the vehicle 10 is turned off.

Distance Measurement Method Performed by Vehicle Surroundings Monitoring Device

A distance measurement method performed by the vehicle surroundings monitoring device 5 according to the present disclosure will be described with reference to FIG. 3.

Figure 3:
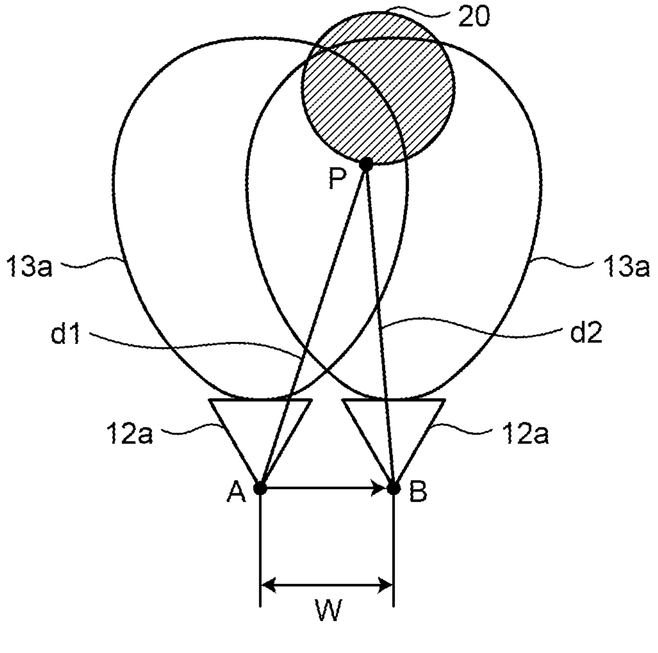
FIG. 3 is a diagram illustrating a distance measurement method based on an output of a distance measurement sensor included in the vehicle surroundings monitoring device according to an embodiment.

FIG. 3 illustrates an example in which the distance measurement sensor 12*a* measures the distance to the target 20 at two different points, namely, a point A and a point B, for example. At this time, the distance measurement sensor 12*a* emits an ultrasonic wave within the distance measurement range 13*a*.

It is assumed that the vehicle surroundings monitoring device 5 obtains a distance measurement value d1 at the point A. It is further assumed that the vehicle surroundings monitoring device 5 obtains a distance measurement value d2 at the point B. In addition, it is assumed that the vehicle surroundings monitoring device 5 measures a distance W between the point A and the point B.

At this time, assuming that the distance measurement value d1 at the point A and the distance measurement value d2 at the point B are obtained by the reflected wave at a same reflection point P of the target 20, the shape of a triangle PAB is uniquely determined in FIG. 3. For example, the coordinates of the reflection point P can be obtained by triangulation. In this manner, the vehicle surroundings monitoring device 5 moves the vehicle 10 to form the triangle PAB, thereby measuring the distance to the target 20. Measuring the distance to the target 20 in this manner is referred to as three-point measurement in the following description.

Obstacle Position Information Storing Method

A method used by the vehicle surroundings monitoring device 5 according to the embodiment to store position information about a target will be described with reference to FIGS. 4A and 4B.

Figure 4A:
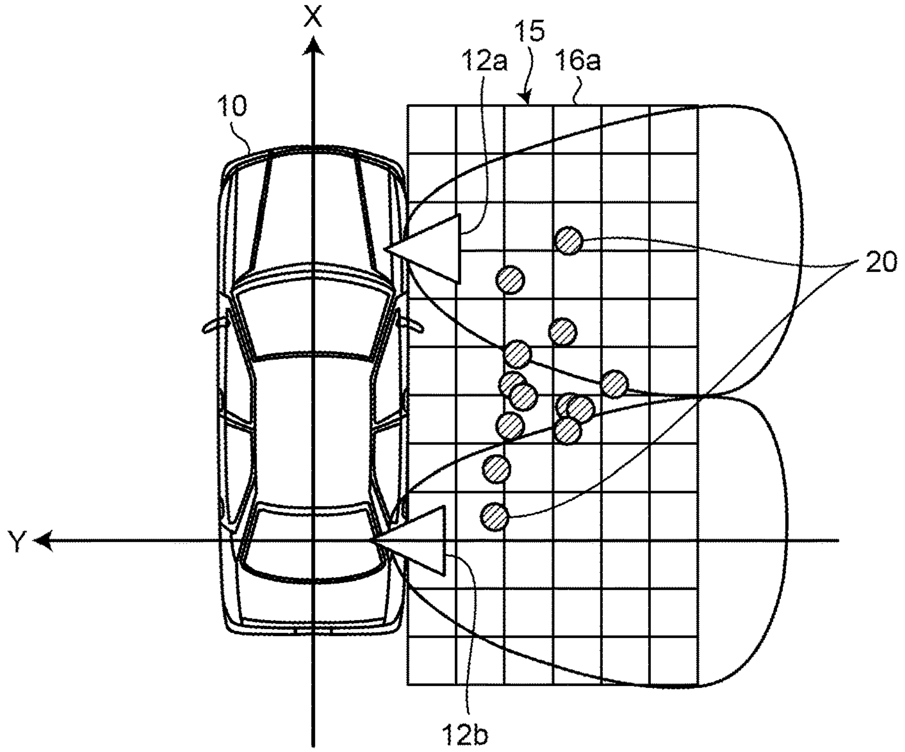
FIG. 4A is a first diagram illustrating a method of storing position information about a target in the vehicle surroundings monitoring device according to the embodiment.

The vehicle surroundings monitoring device 5 sets a grid 15 as illustrated in FIG. 4A around the vehicle 10. The grid 15 is formed along the X axis and the Y axis. The grid 15 is formed by unit grids 16*a* each having the same size in both vertical and horizontal directions, for example.

When, for example, the total length of the vehicle 10 is 5 m, the vehicle surroundings monitoring device 5 sets the grid 15 constituted by the unit grids 16*a*, each having 10 cm long sides in the left/right vicinity of the vehicle 10. Specifically, 50 unit grids 16*a* are formed on each of the left and right sides in the front-rear direction of the vehicle 10, for example, along the X axis, for example. In addition, 15 unit grids 16*a* are formed on each of the left and right sides in the left-right direction of the vehicle 10, for example, along the Y axis, for example.

The vehicle surroundings monitoring device 5 determines the unit grid 16*a* to which the position information about the measured target 20 belongs. When the position information about targets 20 adjacent to each other belongs to the same unit grid 16*a*, the position information about the targets 20 adjacent to each other is compressed into one unit grid 16*a* as the position information about a target 20*a*. Therefore, the amount of information to be stored can be reduced.

Figure 4B:
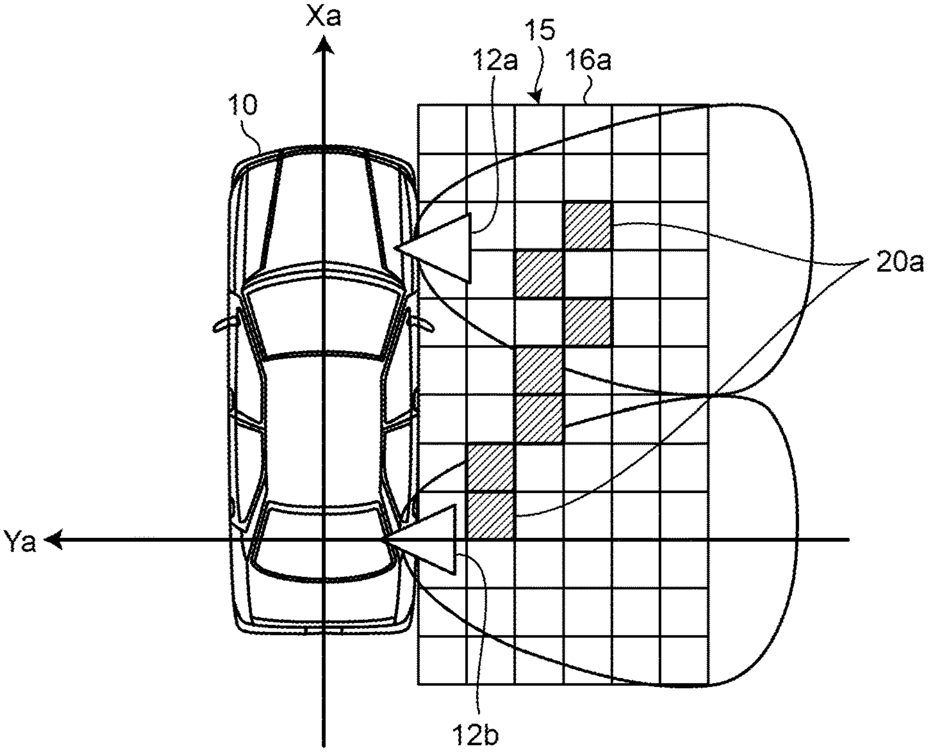
FIG. 4B is a second diagram illustrating a method of storing position information about a target in the vehicle surroundings monitoring device according to the embodiment.

As illustrated in FIG. 4B, the vehicle surroundings monitoring device 5 determines the position of the unit grid 16*a* closest to the vehicle 10 in the lateral direction (Ya axis direction). This is because, when the position information (X, Y) of the targets 20 is measured at the same Xa position on the same side from the vehicle 10, the information used for determining the possibility of contact with the vehicle 10 is the position information about the target 20 closest to the vehicle 10. In this manner, by setting the grid 15, the vehicle surroundings monitoring device 5 resamples (performs resampling on) the position information about the target 20 on an XY coordinate system to the position information about the target 20*a* on an XaYa coordinate system having a lower resolution. For example, the position information (X, Y) of the target 20 illustrated in FIG. 4A is resampled to the position information (Xa, Ya) of the target 20*a* illustrated in FIG. 4B. Note that the XY coordinate system is an example of a first coordinate system in the present disclosure. The XaYa coordinate system is an example of a second coordinate system in the present disclosure.

In the case of the setting condition of the unit grid 16*a* described above, the size of memory used for determining the position of one unit grid 16*a* is 4 bits (0.5 bytes) on each of the left and right sides of the vehicle 10. Therefore, even when the target 20*a* is measured in all the 100 unit grids 16*a* on the left and right sides of the vehicle 10, it is sufficient to have memory of 50 bytes. As described above, in a case where it takes 60 μsec to store 4-byte information in non-volatile memory, it takes about 0.75 msec to store 50 byte information in the nonvolatile memory. This time is less than about 6 msec, which is the time from turn-off of the power switch to the reset of the CPU in the system using the microcomputer according to the existing technology described above. Therefore, when the power switch of the vehicle 10 is turned off, all the position information about the target 20*a* can be stored.

Method of Determining Grid Size

A method of determining the size of the unit grid 16*a* will be described with reference to FIGS. 5A to 5D.

Figure 5A:
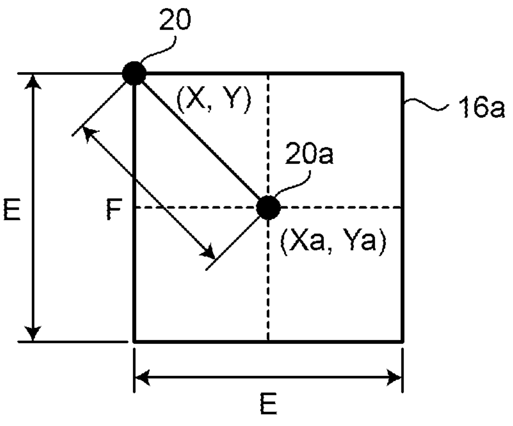
FIG. 5A is a diagram illustrating a method of determining a grid size.

The position information (X, Y) of the target 20 measured by either the distance measurement sensor 12*a* or the distance measurement sensor 12*b* is resampled to the position information (Xa, Ya) of the grid 15, and thus, an error occurs in the position information. For example, as illustrated in FIG. 5A, when the size of one side of the unit grid 16*a* is E, a maximum error F occurring between the position information (X, Y) of the target 20 and the position information (Xa, Ya) of the unit grid 16*a* would be $F=E/\sqrt{2}$. For example, the greater the size of the unit grid 16*a*, the greater the maximum error F between the target 20 and the target 20*a* will be.

It is assumed that the vehicle surroundings monitoring device 5 is used for implementing an emergency automatic braking function that operates the brake of the vehicle 10 when there is a possibility that the vehicle 10 and the target 20 come into contact with each other. Assuming that the distance to the target 20 measured by the vehicle surroundings monitoring device 5 is 15 cm and the measurement error thereof is 5 cm, an allowable upper limit of the maximum error F due to resampling to the unit grid 16*a* is 10 cm. Since the grid size E of one side of the unit grid 16*a* is $10\sqrt{2}$=approximately 14 cm at the maximum, resampling by using the unit grid 16*a* having the grid size E of 14 cm or less on one side makes it possible to implement the emergency automatic braking function while maintaining the original measurement accuracy. More specific description will be given with reference to FIG. 5D below.

In addition, since the grid size E of the unit grid 16*a* also affects the storage capacity of the nonvolatile memory and the writing time to the nonvolatile memory, it is desirable to determine the grid size E in consideration of the specification of the microcomputer and the storage capacity of the nonvolatile memory used in the vehicle surroundings monitoring device 5.

In this manner, the size of the unit grid 16*a* is determined in consideration of a measurement error allowed for the vehicle surroundings monitoring device 5 and specifications of hardware to be used.

Figure 5B:
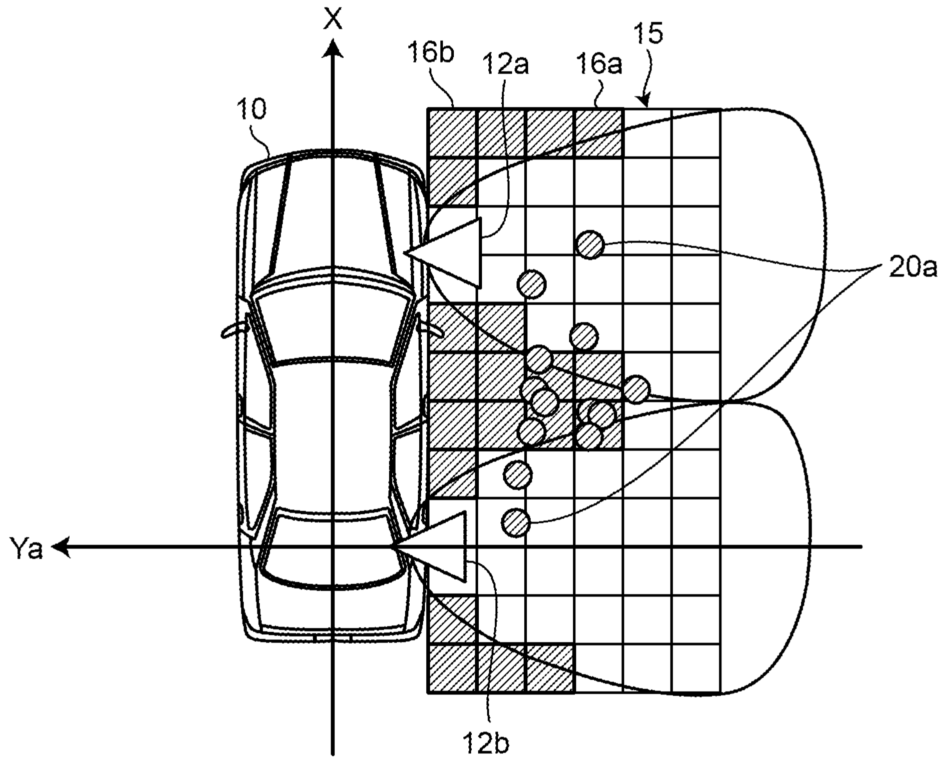
FIG. 5B is a diagram illustrating regions where it is difficult to detect a target at the time of departure of the vehicle.

FIG. 5B illustrates regions of the unit grid 16*b* where it is difficult for the vehicle 10 to detect the target 20 at the time of departure. These unit grids 16*b* indicate regions in the grid 15 illustrated in FIG. 4A, where it is difficult for the vehicle surroundings monitoring device 5 to perform three-point measurement by the distance measurement sensor 12*a* at the time of departure of the vehicle 10. The grids 15 outside the distance measurement range of the distance measurement sensor 12*a* correspond to the unit grids 16*b* in which it is difficult to detect the target 20 at the time of departure.

Figure 5C:
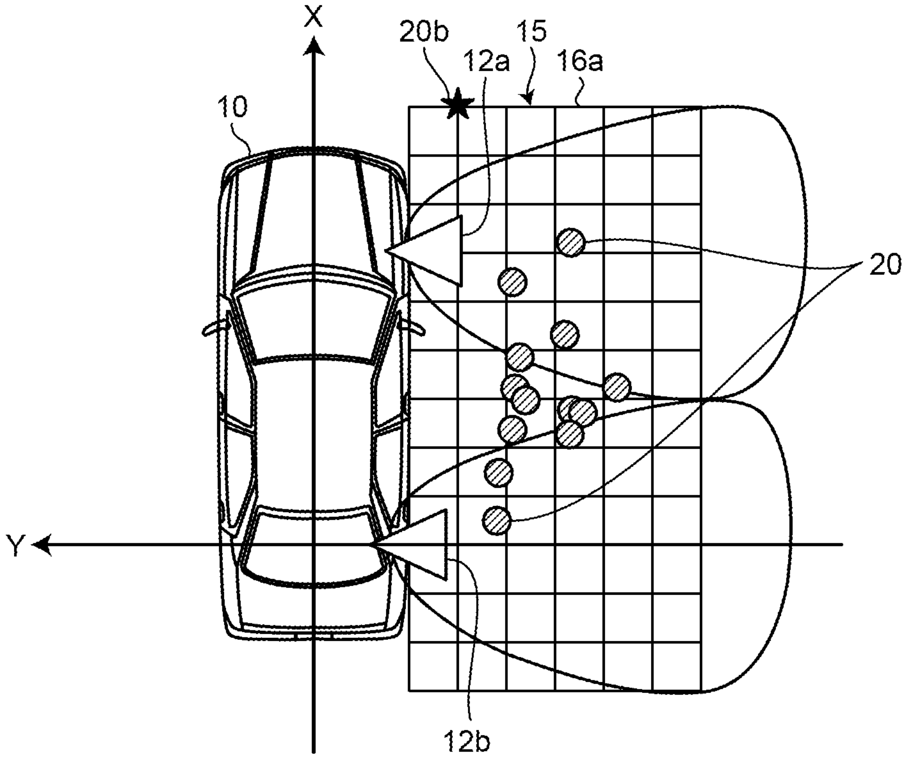
FIG. 5C is a diagram illustrating an exemplary state in which a target is detected at a position where it is difficult to detect the target at the time of departure when the vehicle is parked.
Figure 5D:
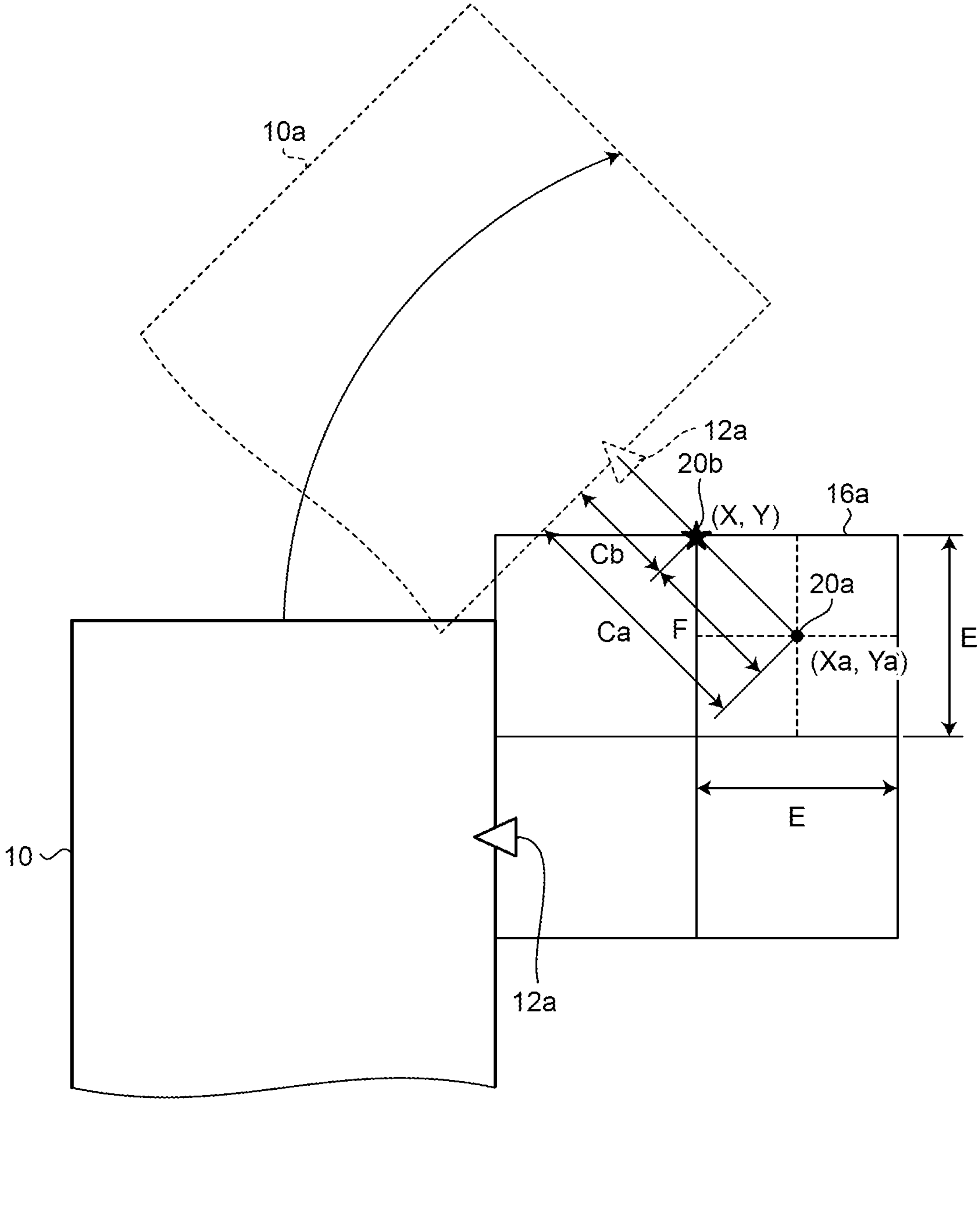
FIG. 5D is a diagram illustrating a clearance distance between the vehicle and the target.

With reference to FIGS. 5C and 5D, the following will describe a clearance distance between the vehicle 10 and a target 20*b* (star sign) at the time of departure when the target 20*b* is detected at the time of parking at the position of the grid (unit grid 16*a* in FIG. 5D) where it is difficult to detect the target 20 at the time of departure of the vehicle 10.

In FIG. 5C, the distance measurement sensor 12*a* detects, at the time of parking, the target 20*b* in the unit grid 16*a* on the right side of the front part of the vehicle. The position of the target 20*b* in this grid is located at the upper left. Therefore, as illustrated in FIG. 5D, the vehicle surroundings monitoring device 5 resamples the position of the target 20*b* to the position of the target 20*a*.

Here, after the departure of the vehicle 10, the vehicle surroundings monitoring device 5 desirably operates the emergency automatic brake at the position of a vehicle 10*a* illustrated in FIG. 5D with respect to the target 20*b* even with no three-point measurement performed by the distance measurement sensor 12*a* with respect to the target 20*b*.

At this time, since the measurement error of the distance to the target is 5 cm, the vehicle surroundings monitoring device 5 controls to operate the emergency automatic brake at a position where a clearance distance Cb with the target 20*b* in practice is at least 5 cm or more.

When the measurement error is 5 cm and the grid size E is 14 cm, the maximum error F is 10 cm. Therefore, by setting a clearance distance Ca to the target 20*a* to 15 cm as a condition for operating the emergency automatic brake on the vehicle 10, the vehicle surroundings monitoring device 5 can control the emergency automatic brake of the vehicle 10 at the position of the vehicle 10*a*, which is, for example, the position where the clearance distance Cb with respect to the target 20*b* in practice is the same distance as the measurement error 5 cm.

The vehicle surroundings monitoring device 5 may determine the grid size E in accordance with the clearance distance Ca. Note that the clearance distances Ca and Cb are distances between the distance measurement sensor 12*a* and the target in a direction perpendicular to the side surface of the vehicle 10*a* when the vehicle 10 is at the position of the vehicle 10*a* in FIG. 5D.

Determination of Validity of Stored Target Position Information

The validity of the position information about the target stored in the vehicle surroundings monitoring device 5 will be described with reference to FIG. 6.

Here is an assumable case of the vehicle 10 including the vehicle surroundings monitoring device 5 of the embodiment, where the power switch is turned off and then turned on again. At this time, in a case where there is no change in the positions of obstacles around the vehicle 10 before and after turning on the power switch, it is possible to control the vehicle 10 (including emergency automatic brake, automatic exit, obstacle notification, etc.) when the power switch is turned on by using the position information about the target 20*a* stored when the power switch is turned off. However, there may be a case where the position of the obstacle when the power switch is turned off is different from the position of the obstacle when the power switch is turned on. For example, there is a case where an adjacent vehicle present at the time of parking is not present at the time of leaving the parking slot.

The vehicle surroundings monitoring device 5 according to the embodiment has a function to invalidate the position information about the target 20*a* stored when the power switch is turned off in a case where the distance measurement information around the host vehicle is different between the time of turn-off of the power switch and the time of turn-on of the power switch in this manner.

FIG. 6 is a diagram illustrating states of change in the position information about the target 20*a* around the vehicle 10, which occurs at the turn-off of the power switch and at the turn-on of the power switch.

The vehicle 10 is stationary when the power switch is turned on, so that it is difficult to determine the three-dimensional position of the target as described with reference to FIG. 3. Therefore, the output of the distance measurement sensor 12 at the time of turn-on of the power switch illustrated in FIG. 6 simply represents whether a target 20*a* exists within the distance measurement range of the distance measurement sensor.

Pattern 1 illustrated in FIG. 6 represents a case where the outputs of the two distance measurement sensors installed on the side of the vehicle 10 have no change between the time of turn-off of the power switch (power OFF) and the time of turn-on of the power switch (power ON). Such a pattern is observed in a case where, for example, a vehicle parked next to the host vehicle at a time of power OFF is still parked at a time of power ON, as illustrated in Pattern 1. In such a case, the vehicle surroundings monitoring device 5 uses, as valid at a time of power ON, the position information about the target 20*a* stored at a time of power OFF. In addition, Pattern 2 illustrates a case where no obstacle exists in the distance measurement ranges of the two distance measurement sensors, whereas an obstacle such as a pole exists outside the distance measurement ranges of the two distance measurement sensors. In such a case, although the output of the distance measurement sensor itself does not change between the time of power switch OFF and the time of power switch ON, an obstacle is detected outside the distance measurement ranges of the two distance measurement sensors. Accordingly, the vehicle surroundings monitoring device 5 uses, as valid at a time of power ON, the position information about the target 20*a* stored at a time of power OFF.

Pattern 2 illustrated in FIG. 6 illustrates a case where an output of the rear measurement sensor among the two distance measurement sensors installed on the side of the vehicle 10 has a change between the time of turn-off of the power switch (at a time of power OFF) and the time of turn-on of the power switch (at a time of power ON). Such a pattern is observed in a case where, for example, a vehicle parked next to the host vehicle at a time of power OFF has been changed to another vehicle with a shorter length at a time of power ON, as illustrated in Pattern 1. In such a case, the vehicle surroundings monitoring device 5 determines whether to validate or invalidate the position information about the target 20*a* stored at a time of power OFF according to details of the application. Specifically, when the vehicle 10 has an emergency automatic braking function, it is desirable to invalidate the position information about the target 20*a* stored at a time of power OFF, and operate the application on the basis of distance measurement information acquired at a time of power ON and the distance measurement information measured after the vehicle 10 starts moving. Meanwhile, when the vehicle 10 has an automatic exit function to perform autonomous traveling to allow the vehicle to exit the parking lot, it is desirable, assuming the worst, to start the operation of the automatic exit function by validating the position information about the target 20*a* stored at a time of power OFF.

Pattern 2 illustrated in FIG. 6 represents a case where no obstacle existed in the distance measurement ranges of the two distance measurement sensors and an obstacle is detected outside the distance measurement ranges of the two distance measurement sensors at a time of power OFF and then, no obstacle is found outside the distance measurement ranges of the two distance measurement sensors and the rear distance measurement sensor detects an obstacle at a time of power ON. Also in such a case, the vehicle surroundings monitoring device 5 determines whether to validate or invalidate the position information about the target 20*a* stored at a time of power OFF in accordance with details of the application. Specifically, when the vehicle 10 has an emergency automatic braking function, it is desirable to invalidate the position information about the target 20*a* stored at a time of power OFF, and operate the application on the basis of distance measurement information acquired at a time of power ON and the distance measurement information measured after the vehicle 10 starts moving. Meanwhile, when the vehicle 10 has an automatic exit function, it is desirable, assuming the worst, to start the operation of the automatic exit function by validating the position information about the target 20*a* stored at a time of power OFF.

Pattern 3 illustrated in FIG. 6 represents a case where the output of the front measurement sensor among the two distance measurement sensors installed on the side of the vehicle 10 has a change between the time of turn-off of the power switch (power OFF) and at the time of turn-on of the power switch (power ON). Also at this time, similarly to Pattern 2 described above, the vehicle surroundings monitoring device 5 may determine whether to validate or invalidate the position information about the target 20*a* stored at a time of power OFF in accordance with details of the application.

Pattern 4 illustrated in FIG. 6 represents a case where the outputs of the two distance measurement sensors, which are installed on the side of the vehicle 10, each have a change between the time of turn-off of the power switch (power OFF) and the time of turn-on of the power switch (power ON). This pattern is observed in a case where, for example, a vehicle parked next to the host vehicle at a time of power OFF has left the parking lot at a time of power ON, as illustrated in Pattern 1. In such a case, the vehicle surroundings monitoring device 5 invalidates the position information about the target 20*a* stored at a time of power OFF, and starts the operation of the application on the basis of the information detected at a time of power ON. Pattern 2 is a case where no obstacle exited in the distance measurement ranges of the two distance measurement sensors and an obstacle such as a pole existed outside the distance measurement ranges of the two distance measurement sensors at a time of power OFF, a case where both of the two distance measurement sensors detect the obstacle at a time of power ON. In such a case, the vehicle surroundings monitoring device 5 invalidates the position information about the target 20*a* stored at a time of power OFF, and starts the operation of the application on the basis of the information detected at a time of power ON.

Note that the vehicle surroundings monitoring device 5 may operate, assuming the worst, the above-described application assuming that the obstacle detected at the time of turn-off of the power switch still exists when the power switch is turned on. When the vehicle 10 starts moving, distance measurement is performed by the method described with reference to FIG. 3. Therefore, at a point where it is found that there is no obstacle in practice, the position information about the target 20*a* stored when the power switch is turned off is discarded and updated to new information.

Hardware Configuration of Vehicle Surroundings Monitoring Device

Figure 7:
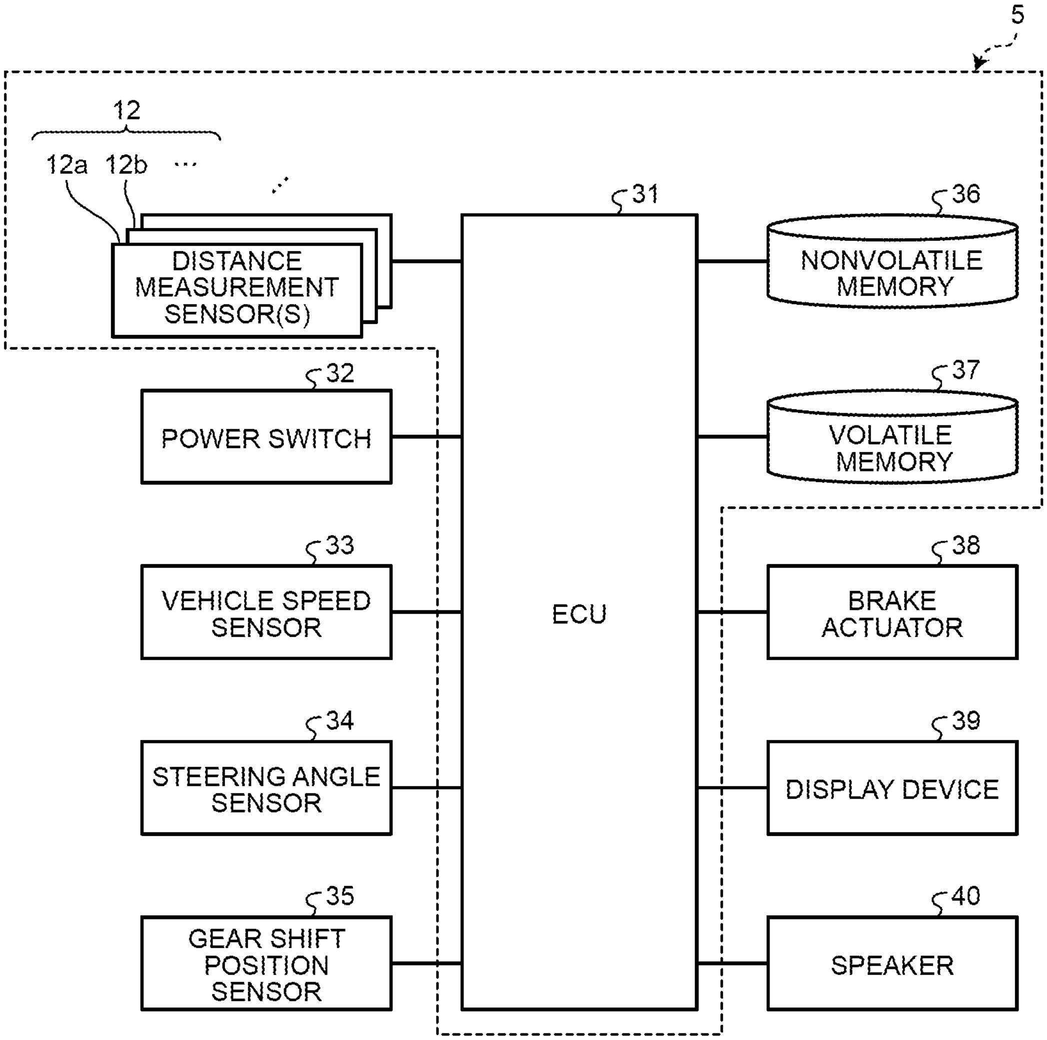
FIG. 7 is a hardware block diagram illustrating an example of a hardware configuration of the vehicle surroundings monitoring device according to the embodiment.

A hardware configuration of the vehicle surroundings monitoring device 5 according to the embodiment will be described with reference to FIG. 7.

The vehicle surroundings monitoring device 5 includes a distance measurement sensor 12, an ECU 31, nonvolatile memory 36, and volatile memory 37.

The vehicle surroundings monitoring device 5 includes an ECU 31 for controlling each component of the vehicle surroundings monitoring device 5. The ECU 31 includes a central processing unit (CPU) (not illustrated).

The ECU 31 is connected to various sensors such as a distance measurement sensor 12, a power switch 32 as an input device, a vehicle speed sensor 33, a steering angle sensor 34, and a gear shift position sensor 35.

The distance measurement sensor 12 is the above-described distance measurement sensors 12*a*, 12*b*, etc. installed on the vehicle 10. In the embodiment, the distance measurement sensor 12 is described as being installed on the sides of the vehicle 10, whereas the distance measurement sensor 12 may be installed in front of or rear of the vehicle 10. Moreover, here, the distance measurement sensor 12 is described as an ultrasonic sensor, whereas the distance measurement sensor 12 may be a millimeter wave radar, for example. Note that the distance measurement sensor 12 is an example of a distance measurement device in the present disclosure.

The power switch 32 is a switch that enables operation of a drive source of the vehicle 10. An example of the power switch 32 is an ignition switch in a non-electric vehicle, and is an electric power switch in an electric vehicle.

The vehicle speed sensor 33 is a sensor that detects the vehicle speed of the vehicle 10.

The steering angle sensor 34 is a sensor that detects a steering angle of the vehicle 10.

The gear shift position sensor 35 is a sensor that detects a gear shift position of the vehicle 10.

In addition, the ECU 31 is connected to nonvolatile memory 36 and volatile memory 37 as storage devices.

The nonvolatile memory 36 is a storage device that retains storage information even when the power is turned off. Examples of the nonvolatile memory 36 include ROM or flash memory. The nonvolatile memory 36 stores various parameters and control programs used by the vehicle surroundings monitoring device 5. In addition, the nonvolatile memory 36 stores a distance measurement result of the distance measurement sensor 12 when the power switch 32 of the vehicle 10 is turned off. The nonvolatile memory 36 is an example of a storage device in the present disclosure.

The volatile memory 37 is a storage device in which storage information is erased when the power is turned off. Examples of the volatile memory 37 include DRAM and SRAM. The volatile memory 37 is used as work memory when the ECU 31 performs various types of processing. For example, the volatile memory 37 forms a main storage region of the ECU 31.

The ECU 31 is further connected to a brake actuator 38, a display device 39, and a speaker 40 as output devices.

The brake actuator 38 is an actuator that controls the brake of the vehicle 10.

The display device 39 is a device such as a liquid crystal panel or an EL panel that displays various types of visual information related to the vehicle surroundings monitoring device 5 to the driver of the vehicle 10.

The speaker 40 displays various types of auditory information related to the vehicle surroundings monitoring device 5 to the driver of the vehicle 10.

Functional Configuration of Vehicle Surroundings Monitoring Device

A functional configuration of the vehicle surroundings monitoring device 5 according to the embodiment will be described with reference to FIG. 8.

Figure 8:
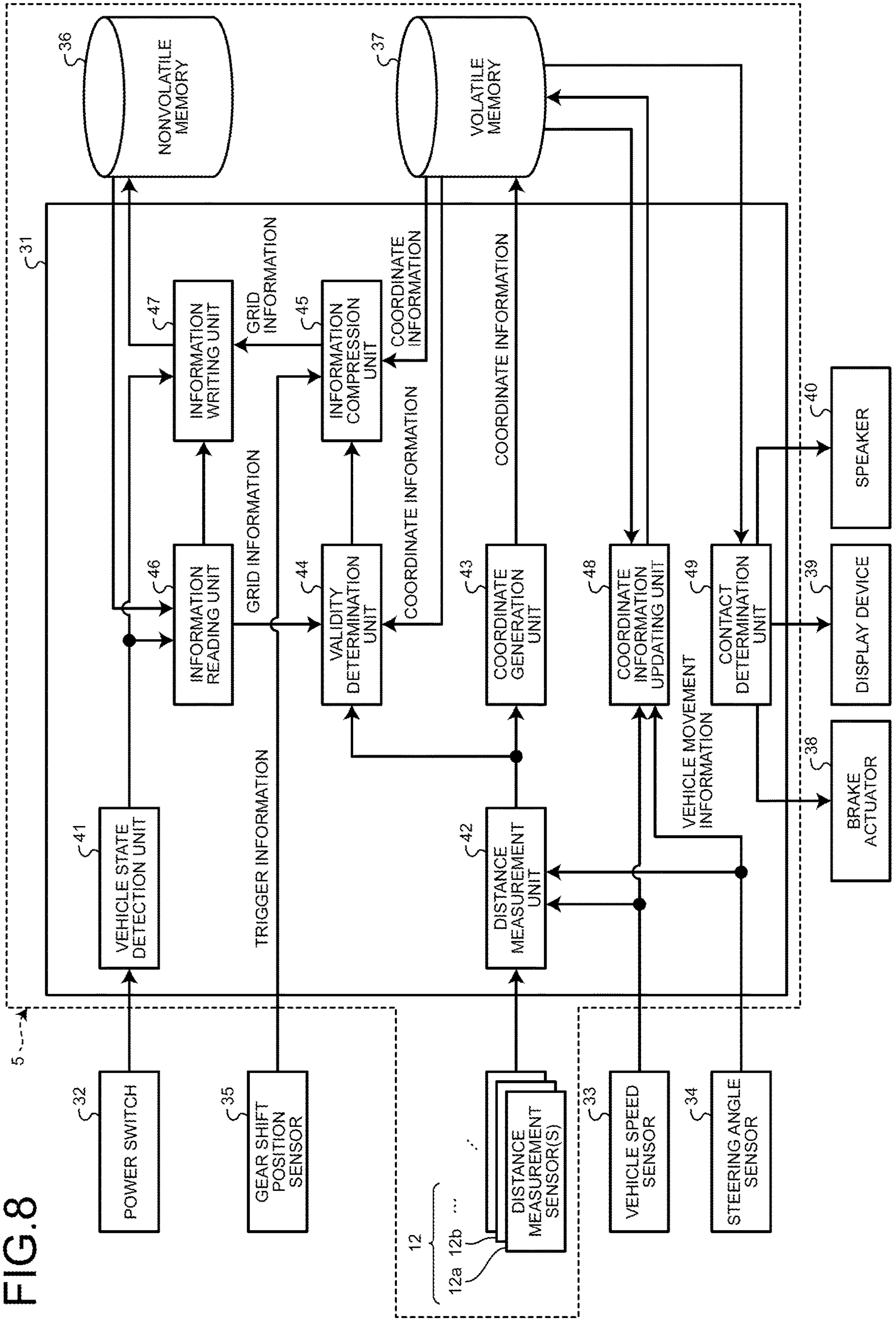
FIG. 8 is a functional block diagram illustrating an example of a functional configuration of the vehicle surroundings monitoring device according to the embodiment.

The ECU 31 of the vehicle surroundings monitoring device 5 actualizes, as functional units, the following units illustrated in FIG. 8: a vehicle state detection unit 41 (an example of a vehicle state detection circuit); a distance measurement unit 42 (an example of a distance measurement circuit); a coordinate generation unit 43; a validity determination unit 44 (an example of a validity determination circuit); an information compression unit 45 (an example of an information compression circuit); an information reading unit 46 (an example of a); an information writing unit 47 (an example of an information writing circuit); a coordinate information updating unit 48; and a contact determination unit 49 (an example of a contact determination circuit).

The vehicle state detection unit 41 acquires the state of the power switch 32 so as to detect the power state of the vehicle 10. The vehicle state detection unit 41 is an example of a vehicle state detection circuit in the present disclosure.

The distance measurement unit 42 measures coordinates of an obstacle around the vehicle 10 by using an output of the distance measurement sensor 12 and movement information about the vehicle 10, which is based on outputs of the vehicle speed sensor 33 and the steering angle sensor 34. More specifically, the distance measurement unit 42 determines the position of the obstacle around the vehicle 10 on the basis of the first time point at which the distance measurement sensor 12 outputs the transmission wave, the position of the vehicle 10 at the first time point, the second time point at which the distance measurement sensor 12 detects the reflected wave of the transmission wave, and the position of the vehicle 10 at the second time point. The distance measurement unit 42 is an example of a distance measurement circuit in the present disclosure.

The coordinate generation unit 43 generates position information (X, Y) of the obstacle around the vehicle 10 on the XY coordinate system (first coordinate system) at that time point on the basis of a distance measurement result obtained by the distance measurement unit 42. In addition, the coordinate generation unit 43 stores the generated position information (X, Y) in the volatile memory 37.

The validity determination unit 44 determines whether to validate or invalidate the coordinates of the obstacle read by the information reading unit 46 when the vehicle state detection unit 41 detects the power turn-on of the vehicle 10. More specifically, when the vehicle state detection unit 41 detects the power turn-on of the vehicle 10, the validity determination unit 44 determines whether to validate or invalidate the position information (Xa, Ya) of the obstacle on the basis of the position information (Xa, Ya) of the obstacle read by the information reading unit 46 and the measurement result obtained by the distance measurement sensor 12 at that time point. The validity determination unit 44 is an example of a validity determination circuit in the present disclosure.

The information compression unit 45 operates such that, when trigger information representing the prediction of power-off of the vehicle 10 is detected, the information compression unit 45 converts the position information (X, Y) of the target 20 on the XY coordinate system (first coordinate system) read from the volatile memory 37 into the position information (Xa, Ya) of the target 20*a* on the XaYa coordinate system (second coordinate system). The trigger information representing the prediction of power turn-off of the vehicle 10 is information representing that, when the trigger information is detected, turn-off of the power of the vehicle 10 occurs soon with high probability. Specifically, an example of the trigger information is information indicating "the gear shift position of the vehicle 10 is in P range (parking range)". The activation of a parking brake of the vehicle 10 may be used as the trigger information, or the gear shift position in the P range and the activation of the parking brake at the same time may be used as the trigger information. The information compression unit 45 is an example of an information compression circuit in the present disclosure.

The information reading unit 46 operates such that, when the vehicle state detection unit 41 detects power turn-on of the vehicle 10, the information reading unit 46 reads, from a nonvolatile memory 36 (storage device), position information (Xa, Ya) of the target 20*a* on the XaYa coordinate system (second coordinate system) having been written by the information writing unit 47. The information reading unit 46 is an example of an information reading circuit in the present disclosure.

The information writing unit 47 operates such that, when the vehicle state detection unit 41 detects power-off of the vehicle 10, the information writing unit 47 writes the position information (Xa, Ya) of the obstacle on the XaYa coordinate system (second coordinate system) having a lower resolution than the XY coordinate system (first coordinate system) in the nonvolatile memory 36 (storage device). The information writing unit 47 is an example of an information writing circuit in the present disclosure.

The coordinate information updating unit 48 updates the position information about the obstacle (X, Y) by overwriting the past position information about the obstacle (X, Y) with the position information about the obstacle (X, Y) measured at that time point.

The contact determination unit 49 determines whether the vehicle 10 and the obstacle come in contact with each other by using the coordinates of the obstacle read by the information reading unit 46. On the basis of the determination result, the contact determination unit 49 controls the brake actuator 38 to stop the vehicle 10. In addition, the contact determination unit 49 transmits the determination result to the driver of the vehicle 10 via the display device 39 and the speaker 40. The contact determination unit 49 is an example of a contact determination circuit in the present disclosure.

Figure 9:
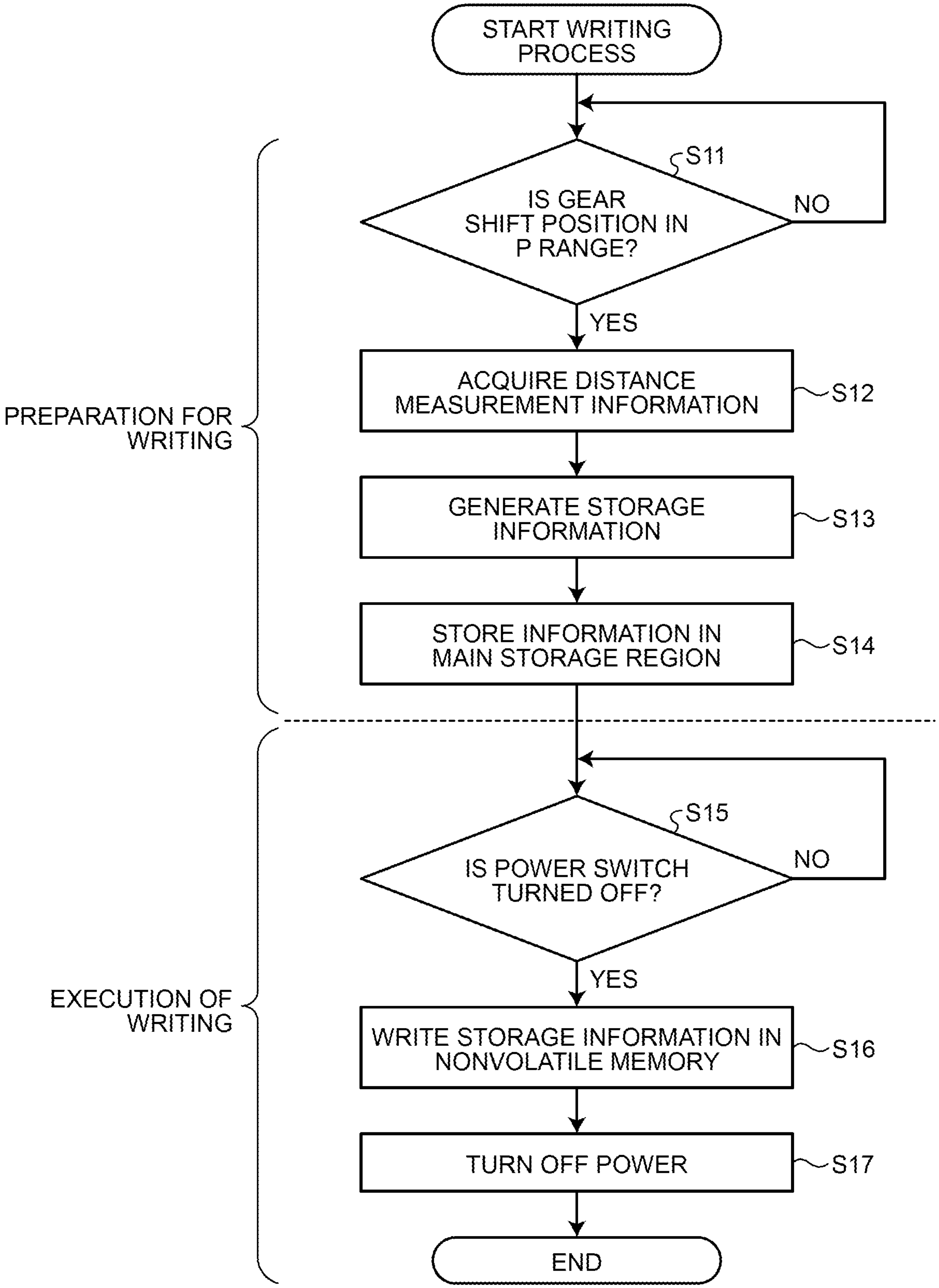
FIG. 9 is a flowchart illustrating an example of a flow of a position information writing process performed by the vehicle surroundings monitoring device according to the embodiment.

Flow of Position Information Writing Process Performed by Vehicle Surroundings Monitoring Device A flow of a position information writing process performed by the vehicle surroundings monitoring device 5 will be described with reference to FIG. 9.

The information compression unit 45 acquires the output of the gear shift position sensor 35 and determines whether the gear shift position of the vehicle 10 is in the P range (step S11). In response to determining that the gear shift position is in the P range (step S11: Yes), the process proceeds to step S12. In contrast, when the gear shift position is not determined to be in the P range (step S11: No), step S11 is repeated.

In response to determining, in step S11, that the gear shift position is in the P range, the information compression unit 45 acquires, from the volatile memory 37, distance measurement information (position information (X, Y) about the obstacle) at that time point generated by the distance measurement unit 42 and the coordinate generation unit 43 (step S12).

Next, the information compression unit 45 generates storage information to be stored when the power switch of the vehicle 10 is turned off, by converting the position information (X, Y) of the obstacle acquired in step S12 into position information (Xa, Ya) on the grid 15 (step S13).

Subsequently, the information compression unit 45 temporarily stores the storage information generated in step S13 in the main storage region formed by the volatile memory 37 (step S14). Steps S11 to S14 are preparation steps for storing, in the nonvolatile memory 36, the position information (Xa, Ya) that has been compressed.

The vehicle state detection unit 41 determines whether power switch 32 of the vehicle 10 is turned off (step S15). In response to determining that the power switch 32 of the vehicle 10 is turned off (step S15: Yes), the process proceeds to step S16. In contrast, when the power switch 32 of the vehicle 10 is not determined to be turned off (step S15: No), step S15 is repeated.

In response to determining, in step S15, that the power switch 32 of the vehicle 10 is turned off, the information writing unit 47 writes the position information (Xa, Ya) generated in step S13 in the nonvolatile memory 36 (step S16).

Thereafter, when a predetermined time elapses after the power switch 32 of the vehicle 10 is turned off, the power of the ECU 31 is turned off (step S17). Thereafter, the vehicle surroundings monitoring device 5 ends the process of FIG. 9. Steps S15 to S17 are steps of writing the compressed position information (Xa, Ya) in the nonvolatile memory 36.

Figure 10:
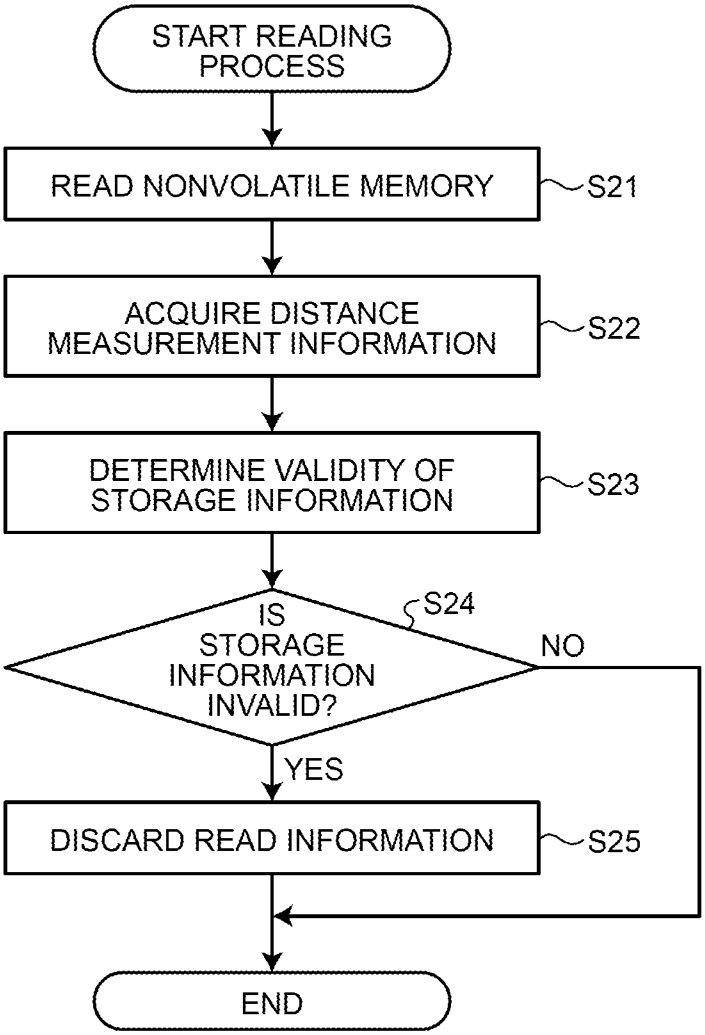
FIG. 10 is a flowchart illustrating an example of a flow of a position information reading process performed by the vehicle surroundings monitoring device according to the embodiment.

Flow of Position Information Reading Process Performed by Vehicle Surroundings Monitoring Device A flow of a position information reading process performed by the vehicle surroundings monitoring device 5 will be described with reference to FIG. 10.

When the power switch 32 of the vehicle 10 is turned on to reset the ECU 31, the information reading unit 46 reads position information (Xa, Ya) from the nonvolatile memory 36 (step S21).

Subsequently, the validity determination unit 44 acquires distance measurement information measured by the distance measurement unit 42 (step S22). Note that the distance measurement information acquired here does not indicate an accurate position of an obstacle, but does indicate whether there is an obstacle within the distance measurement range of each of the distance measurement sensors 12*a*, 12*b*, etc.

The validity determination unit 44 compares the position information (Xa, Ya) read in step S21 with the distance measurement information acquired in step S22 to determine the validity of the position information (Xa, Ya) (step S23).

By performing the determination in step S23, the validity determination unit 44 determines whether the position information (Xa, Ya) read in step S21 is invalid (step S24). In response to determining that the position information (Xa, Ya) is invalid (step S24: Yes), the process proceeds to step S25. In contrast, when the position information (Xa, Ya) is not determined to be invalid (step S24: No), the vehicle surroundings monitoring device 5 determines that the position information (Xa, Ya) is valid, and ends the process of FIG. 10. Thereafter, the vehicle surroundings monitoring device 5 uses the position information (Xa, Ya) and the distance measurement information acquired at the current time point to make a contact determination between the vehicle 10 and surrounding obstacles.

In response to determining, in step S24, that the position information (Xa, Ya) is invalid, the validity determination unit 44 discards the position information (Xa, Ya) read in step S21 (step S25). The vehicle surroundings monitoring device 5 ends the process of FIG. 10. Thereafter, the vehicle surroundings monitoring device 5 performs contact determination between the vehicle 10 and surrounding obstacles by using the distance measurement information acquired at the current time point.

Action and Effect of Embodiment

As described above, the vehicle surroundings monitoring device 5 according to the embodiment is a vehicle surroundings monitoring device that is mounted on the vehicle 10 and monitors the distance between the vehicle 10 and surrounding obstacles. The vehicle surroundings monitoring device 5 includes: the distance measurement unit 42 (distance measurement circuit) that measures the coordinates of the obstacle on the XY coordinate system (first coordinate system) on the basis of the first time point at which the distance measurement sensor 12 (distance measurement device) outputs the transmission wave, the position of the vehicle 10 at the first time point, the second time point at which the distance measurement sensor 12 detects the reflected wave of the transmission wave, and the position of the vehicle 10 at the second time point; the vehicle state detection unit 41 (vehicle state detection circuit) that detects the state of the power of the vehicle 10; the information writing unit 47 (information writing circuit) that writes, into the nonvolatile memory 36 (storage device), coordinates of the obstacle on the XaYa coordinate system (second coordinate system) having a lower resolution than the XY coordinate system when the vehicle state detection unit 41 detects turn-off of the power in the vehicle 10; the information reading unit 46 (information reading circuit) that reads, from the nonvolatile memory 36, the coordinates of the obstacle on the XaYa coordinate system written by the information writing unit 47 when the vehicle state detection unit 41 detects the power turn-on of the vehicle 10; and the contact determination unit 49 (contact determination circuit) that determines whether the vehicle 10 and the obstacle come in contact with each other by using the coordinates of the obstacle read by the information reading unit 46. Accordingly, when the power switch 32 of the vehicle 10 is turned off, it is possible to store information related to the position of the surrounding obstacle measured in the past with a small storage capacity.

The vehicle surroundings monitoring device 5 according to the embodiment further includes the information compression unit 45 (information compression circuit) that converts the coordinates of the obstacle on the XY coordinate system (first coordinate system) into the coordinates of the obstacle on the XaYa coordinate system (second coordinate system) after the trigger information representing the prediction of the power turn-off of the vehicle 10 is detected. Accordingly, coordinates of the compressed obstacle can be generated prior to the turn-off of the power switch 32.

In addition, in the vehicle surroundings monitoring device 5 according to the embodiment, the XaYa coordinate system (second coordinate system) defines the position of the grid 15 set to be superimposed on the XY coordinate system (first coordinate system), the grid 15 being a grid to which the coordinates of the obstacle in the XY coordinate system belong, as the coordinates of the obstacle on the XaYa coordinate system. Therefore, the data amount of the coordinates of the obstacle can be compressed with a simple calculation.

The vehicle surroundings monitoring device 5 according to the embodiment further includes the validity determination unit 44 that determines whether to validate or invalidate the coordinates of the obstacle read by the information reading unit 46 when the vehicle state detection unit 41 detects the power turn-on of the vehicle 10. Therefore, even when the state of the obstacle around the vehicle 10 changes between the time of turn-off of the power switch 32 of the vehicle 10 and the time of turn-on of the power switch 32, it is possible to perform accurate contact determination with the surrounding obstacle.

In addition, in the vehicle surroundings monitoring device 5 according to the embodiment, the validity determination unit 44 determines whether to validate or invalidate the coordinates of the obstacle read by the information reading unit 46 on the basis of the coordinates of the obstacle read by the information reading unit 46 when the vehicle state detection unit 41 detects the power turn-on of the vehicle 10 and on the basis of the measurement result obtained by the distance measurement sensor 12 (distance measurement device). Therefore, even when the state of the obstacle around the vehicle 10 changes between the time of turn-off of the power switch 32 of the vehicle 10 and the time of turn-on of the power switch 32, it is possible to perform accurate contact determination with the surrounding obstacle.

Modification of Embodiment

Hereinafter, a modification of the vehicle surroundings monitoring device 5 according to the present disclosure will be described with reference to FIGS. 11A and 11B. In the above-described embodiment, the vehicle surroundings monitoring device 5 sets a grid having a uniform size around the vehicle 10. On the other hand, the vehicle surroundings monitoring device 5 described in the modification changes the size of the grid set around the vehicle 10 in accordance with the position.

Figure 11A:
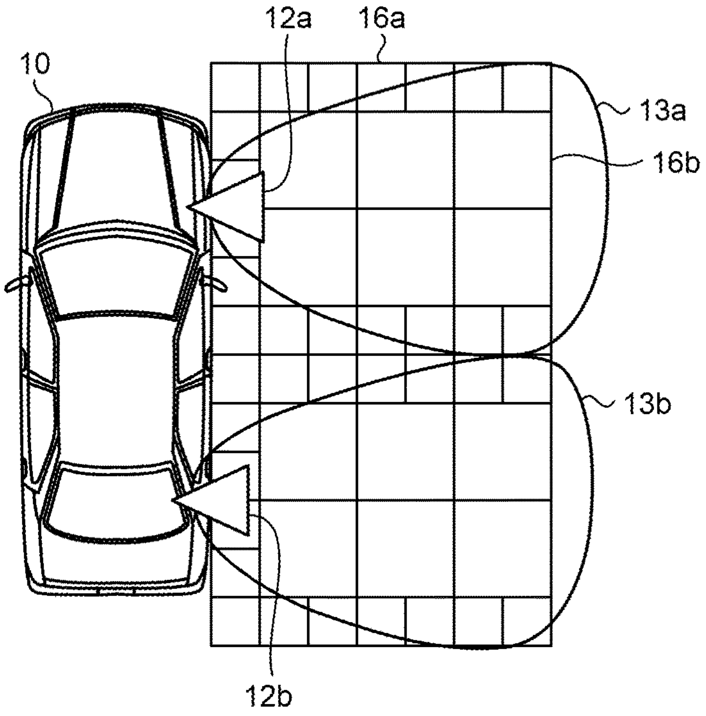
FIG. 11A is a first diagram illustrating a modification of the embodiment.

In FIG. 11A, each of unit grids 16*b* has a lower (or coarser) resolution, for example, has a larger size, than each of the unit grids 16*a*. The unit grids 16*b* are set inside the distance measurement range 13*a* of the distance measurement sensor 12*a* and inside the distance measurement range 13*b* of the distance measurement sensor 12*b*. The unit grids 16*a* are set for places other than those ranges 13*a* and 13*b*.

As described above, the unit grid 16*a* is to be provided in a size not exceeding the allowable measurement error. In contrast, the unit grid 16*b* may be provided in a size exceeding the allowable measurement error described above. This is because, inside the distance measurement ranges 13*a* and 13*b*, the position information (X, Y) of the target is measured with high accuracy after the vehicle 10 starts to move, with the position information (Xa, Ya) indicated by the unit grid 16*b* updated to the position information (X, Y) with higher accuracy.

The grid size setting is performed by the information compression unit 45 (refer to FIG. 8) described above. In this manner, by setting the unit grid 16*b* larger in size than the unit grid 16*a*, it is possible to further reduce the amount of information to be stored in the vehicle surroundings monitoring device 5.

Figure 11B:
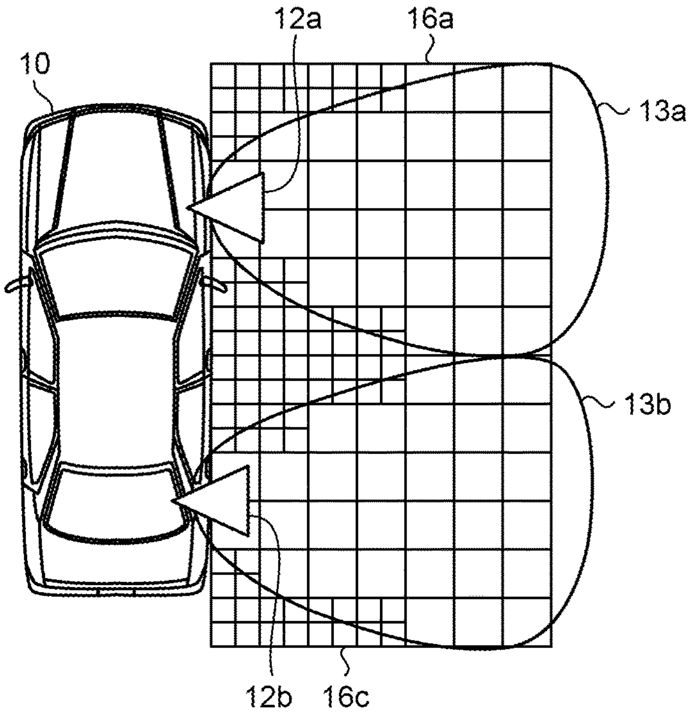
FIG. 11B is a second diagram illustrating a modification of the embodiment.

In FIG. 11B, each of unit grids 16*c* has a higher (or finer) resolution, for example, has a smaller size, than each of the unit grids 16*a*. The unit grids 16*c* are set outside the distance measurement range 13*a* of the distance measurement sensor 12*a* and outside the distance measurement range 13*b* of the distance measurement sensor 12*b*. The unit grids 16*a* are set for places other than those ranges 13*a* and 13*b*.

By setting such a unit grid 16*c*, position information (Xa, Ya) of the target 20*a* outside the distance measurement ranges 13*a* and 13*b* can be stored with higher accuracy. Incidentally, the amount of information to be stored is increased by setting the unit grid 16*c* as compared with a case of setting the uniform unit grid 16*a*, and thus, the size of the unit grid 16*c* is set so that the operation of storing the position information (Xa, Ya) can be performed in time at turn-off of the power switch 32 of the vehicle 10.

Although not illustrated, it is also allowable to have a configuration combining FIGS. 11A and 11B, for example, the unit grids 16*b* being large (or coarse) are set inside the distance measurement ranges 13*a* and 13*b*, while the unit grids 16*c* being small (or fine) are set outside the distance measurement ranges 13*a* and 13*b*.

Action and Effect of Modification of Embodiment

As described above, in the vehicle surroundings monitoring device 5 according to the modification of the embodiment, the size of the grid 15 is set to be smaller (or finer) in a range outside the distance measurement range of the distance measurement sensor 12 (distance measurement device) when the vehicle 10 stops in the vicinity of the vehicle 10. Therefore, when the power switch 32 of the vehicle 10 is turned on, the position information about the target 20*a* in the region outside the distance measurement range of the distance measurement sensor 12 can be stored with higher resolution.

In addition, in the vehicle surroundings monitoring device 5 according to the modification of the embodiment, the size of the grid 15 is set to be larger (or coarser) in a range inside the distance measurement range of the distance measurement sensor 12 (distance measurement device) when the vehicle 10 stops. Therefore, when the power switch 32 of the vehicle 10 is turned on, the position information about the target 20*a* in the region within the distance measurement range of the distance measurement sensor 12 is stored with lower resolution, making it possible to further reduce the storage capacity.

The embodiments of the present disclosure have been described as above, in which the above-described embodiments have been presented as examples, and are not intended to limit the scope of the present disclosure. This novel embodiment can be implemented in various other forms. In addition, various omissions, substitutions, and alterations can be made without departing from the gist of the disclosure. In addition, this embodiment is included in the scope and spirit of the disclosure, and is included in the disclosure described in the claims and the equivalent scope thereof.

In the above-described embodiment, the notation " . . . unit", " . . . -er", " . . . -or", and " . . . -ar" used for each component may be replaced with another notation such as " . . . circuitry (or circuit)", " . . . assembly", " . . . device", " . . . section", or " . . . module".

While the embodiments have been described above with reference to the drawings, the present disclosure is not limited to such examples. It is obvious that those skilled in the art can conceive various alterations or modifications within the scope described in the claims. It should be understood that such alterations or modifications also belong to the technical scope of the present disclosure. Further, the respective constituent elements in the embodiments may be flexibly combined without departing from the scope and spirit of the present disclosure.

The present disclosure can be implemented by software, hardware, or software in cooperation with hardware. Each functional block used in the description of the above embodiment may be partially or entirely implemented as an LSI in the form of an integrated circuit, and each process described in the above embodiment may be partially or entirely controlled by one LSI or a combination of LSIs. The LSI may be constituted with individual chips, or may be constituted with one chip so as to include part of or all the functional blocks. The LSI may be provided with data input/output functions. The LSI can be referred to as an IC, a system LSI, a super LSI, or an ultra LSI in accordance with the degree of integration.

The circuit integration is not limited to the form of LSI, and may be implemented as a dedicated circuit, a general-purpose processor, or a dedicated processor. In addition, it is also allowable to use a field programmable gate array (FPGA) that can be programmed after manufacturing of the LSI or a reconfigurable processor in which connections and settings of circuit cells inside the LSI can be reconfigured. The present disclosure may be implemented as digital processing or analog processing.

Moreover, integration of functional blocks may be implemented by using a technology, specifically, a circuit integration technology emerging as an advanced version of the current semiconductor technology or other derived technologies to replace the LSI. Applicable technologies include biotechnology.

What is claimed is:

1. A vehicle surroundings monitoring device comprising:

a distance measurement circuitry, which, in operation, measures coordinates of an obstacle on a first coordinate system on the basis of a first time point, a position of a vehicle at the first time point, a second time point, and a position of the vehicle at the second time point, the first time point being a time point at which a distance measurement sensor mounted on the vehicle outputs a transmission wave, the second time point being a time point at which the distance measurement sensor detects a reflected wave of the transmission wave;

a vehicle state detection circuitry, which, in operation, detects a state of power of the vehicle;

an information writing circuitry, which, in operation, writes to a memory, coordinates of the obstacle on a second coordinate system having a resolution lower than a resolution of the first coordinate system when the vehicle state detection circuitry detects power turn-off of the vehicle;

an information reading circuitry, which, in operation, reads, from the memory, the coordinates of the obstacle on the second coordinate system written by the information writing circuitry when the vehicle state detection circuitry detects power turn-on of the vehicle; and a contact determination circuitry, which, in operation, determines whether the vehicle and the obstacle come into contact with each other by using the coordinates of the obstacle read by the information reading circuitry, wherein the second coordinate system is a grid being set to be superimposed on the first coordinate system, the coordinates of the obstacle on the second coordinate system is a position of the grid to which the coordinates of the obstacle on the first coordinate system belong, and when the vehicle stops, units of the grid outside of a distance measurement range of the distance measurement sensor and in vicinity of the vehicle are smaller than units of the grid inside of the distance measurement range.

2. The vehicle surroundings monitoring device according to claim 1, further comprising an information compression circuitry, which, in operation, converts, when trigger information representing a prediction of power turn-off of the vehicle is detected, the coordinates of the obstacle on the first coordinate system into the coordinates of the obstacle on the second coordinate system.

3. A vehicle surroundings monitoring device comprising:

a distance measurement circuitry, which, in operation, measures coordinates of an obstacle on a first coordinate system on the basis of a first time point, a position of a vehicle at the first time point, a second time point, and a position of the vehicle at the second time point, the first time point being a time point at which a distance measurement sensor mounted on the vehicle outputs a transmission wave, the second time point being a time point at which the distance measurement sensor detects a reflected wave of the transmission wave;

a vehicle state detection circuitry, which, in operation, detects a state of power of the vehicle;

an information writing circuitry, which, in operation, writes, to a memory, coordinates of the obstacle on a second coordinate system having a resolution lower than a resolution of the first coordinate system when the vehicle state detection circuitry detects power turn-off of the vehicle;

an information reading circuitry, which, in operation, reads, from the memory, the coordinates of the obstacle on the second coordinate system written by the information writing circuitry when the vehicle state detection circuitry detects power turn-on of the vehicle;

a contact determination circuitry, which, in operation, determines whether the vehicle and the obstacle come into contact with each other by using the coordinates of the obstacle read by the information reading circuitry; and a validity determination circuitry, which, in operation, determines whether to validate or invalidate the coordinates of the obstacle read by the information reading circuitry, the determination of validate or invalidate being performed when the vehicle state detection circuitry detects power turn-on of the vehicle.

4. The vehicle surroundings monitoring device according to claim 3, wherein, when the vehicle state detection circuitry detects power turn-on of the vehicle, the validity determination circuitry, in operation, performs the determination of validate or invalidate on the basis of a comparison between (1) the coordinates of the obstacle read by the information reading circuitry and (2) a measurement result obtained by the distance measurement sensor.

5. A vehicle surroundings monitoring method comprising:

measuring coordinates of an obstacle on a first coordinate system on the basis of a first time point, a position of a vehicle at the first time point, a second time point, and a position of the vehicle at the second time point, the first time point being a time point at which a distance measurement sensor mounted on the vehicle outputs a transmission wave, the second time point being a time point at which the distance measurement sensor detects a reflected wave of the transmission wave;

detecting a state of power of the vehicle;

writing, to a memory, coordinates of the obstacle on a second coordinate system having a resolution lower than a resolution of the first coordinate system when power turn-off of the vehicle is detected;

reading, from the memory, the coordinates of the obstacle on the second coordinate system when power turn-on of the vehicle is detected; and determining whether the vehicle and the obstacle come into contact with each other by using the coordinates of the obstacle read from the memory, wherein the second coordinate system is a grid being set to be superimposed on the first coordinate system, the coordinates of the obstacle on the second coordinate system is a position of the grid to which the coordinates of the obstacle on the first coordinate system belong, and when the vehicle stops, units of the grid outside of a distance measurement range of the distance measurement sensor and in vicinity of the vehicle are smaller than units of the grid inside of the distance measurement range.

6. The vehicle surroundings monitoring method according to claim 5, further comprising converting, when trigger information representing a prediction of power turn-off of the vehicle is detected, the coordinates of the obstacle on the first coordinate system into the coordinates of the obstacle on the second coordinate system.

7. The vehicle surroundings monitoring method according to claim 5, further comprising determining whether to validate or invalidate the coordinates of the obstacle read from the memory the determining being performed when power turn-on of the vehicle is detected.

8. The vehicle surroundings monitoring method according to claim 7, wherein, when power turn-on of the vehicle is detected, the determining of validate or invalidate is performed on the basis of a comparison between (1) the coordinates of the obstacle read from the memory and (2) a measurement result obtained by the distance measurement sensor.

9. A non-transitory computer-readable recording medium on which programmed instructions are recorded, the programmed instructions causing a computer to execute processing, the computer being installed on a vehicle to measure a distance between the vehicle to an obstacle around the vehicle, the processing to be executed by the computer comprising:

measuring coordinates of an obstacle on a first coordinate system on the basis of a first time point, a position of the vehicle at the first time point, a second time point, and a position of the vehicle at the second time point, the first time point being a time point at which a distance measurement sensor mounted on the vehicle outputs a transmission wave, the second time point being a time point at which the distance measurement sensor detects a reflected wave of the transmission wave;

detecting a state of power of the vehicle;

writing, to a memory, coordinates of the obstacle on a second coordinate system having a resolution lower than a resolution of the first coordinate system when power turn-off of the vehicle is detected;

reading, from the memory, the coordinates of the obstacle on the second coordinate system when power turn-on of the vehicle is detected; and determining whether the vehicle and the obstacle come into contact with each other by using the coordinates of the obstacle read from the memory, wherein the second coordinate system is a grid being set to be superimposed on the first coordinate system, the coordinates of the obstacle on the second coordinate system is a position of the grid to which the coordinates of the obstacle on the first coordinate system belong, and when the vehicle stops, units of the grid outside of a distance measurement range of the distance measurement sensor and in vicinity of the vehicle are smaller than units of the grid inside of the distance measurement range.

* * * * *